United States Patent [19]
Foxworthy et al.

[11] 3,819,135
[45] June 25, 1974

[54] SYSTEM FOR AUGMENTING AIRCRAFT ATTITUDE STABILITY USING VERTICAL VANE TYPE SENSORS

[75] Inventors: Eugene R. Foxworthy, Howell; Albert Blatter, Southfield; William N. Gamber, Howell; Rex W. Presley, Livonia, all of Mich.; Kenneth W. Verge, Mt. Vernon, Wash.

[73] Assignee: The Bendix Corporation, Southfield, Mich.

[22] Filed: Dec. 15, 1972

[21] Appl. No.: 315,735

[52] U.S. Cl.................. 244/77 D, 73/228, 318/586
[51] Int. Cl. ............................................ B64c 13/18
[58] Field of Search.......... 73/178 R, 180, 186, 228, 114/144 R; 235/150.2; 244/3, 21, 1 SA, 766, 770, 77 E, 87; 318/584–586, 644, 648, 489; 340/27 AT

[56] References Cited
UNITED STATES PATENTS

| | | | |
|---|---|---|---|
| 2,595,363 | 5/1952 | Lee | 244/87 |
| 2,962,243 | 11/1960 | Coleman et al. | 244/77 D |
| 3,072,369 | 1/1963 | Alderson | 244/77 D |
| 3,100,612 | 8/1963 | Owen | 244/77 D |
| 3,260,108 | 7/1966 | Kaminskas | 244/77 D X |
| 3,525,866 | 8/1970 | Sagalyn et al. | 244/1 SA X |
| 3,550,884 | 12/1970 | Meoller | 244/77 E |
| 3,711,042 | 1/1973 | Rempfer et al. | 244/77 D |

Primary Examiner—Trygve M. Blix
Assistant Examiner—Stephen G. Kunin
Attorney, Agent, or Firm—Lester L. Hallacher

[57] ABSTRACT

A system is disclosed herein for augmenting the inherent attitude stability of an aircraft utilizing two vertical weathercock vane type sensors, one mounted near each wing tip of the aircraft. The sensors respond to the air flow and generate signals indicative of the direction of air flow at the wing tips relative to the longitudinal axis of the aircraft. Servo systems respond to the sum and differences of the signals generated by the vertical vane sensors and actuate flight control surfaces augmenting the attitude stability of the aircraft, including the angle of attack of the wing. Rapid system response further provides for excellent gust alleviation.

24 Claims, 11 Drawing Figures

PATENTED JUN 25 1974 3,819,135

PATENTED JUN 25 1974 3,819,135

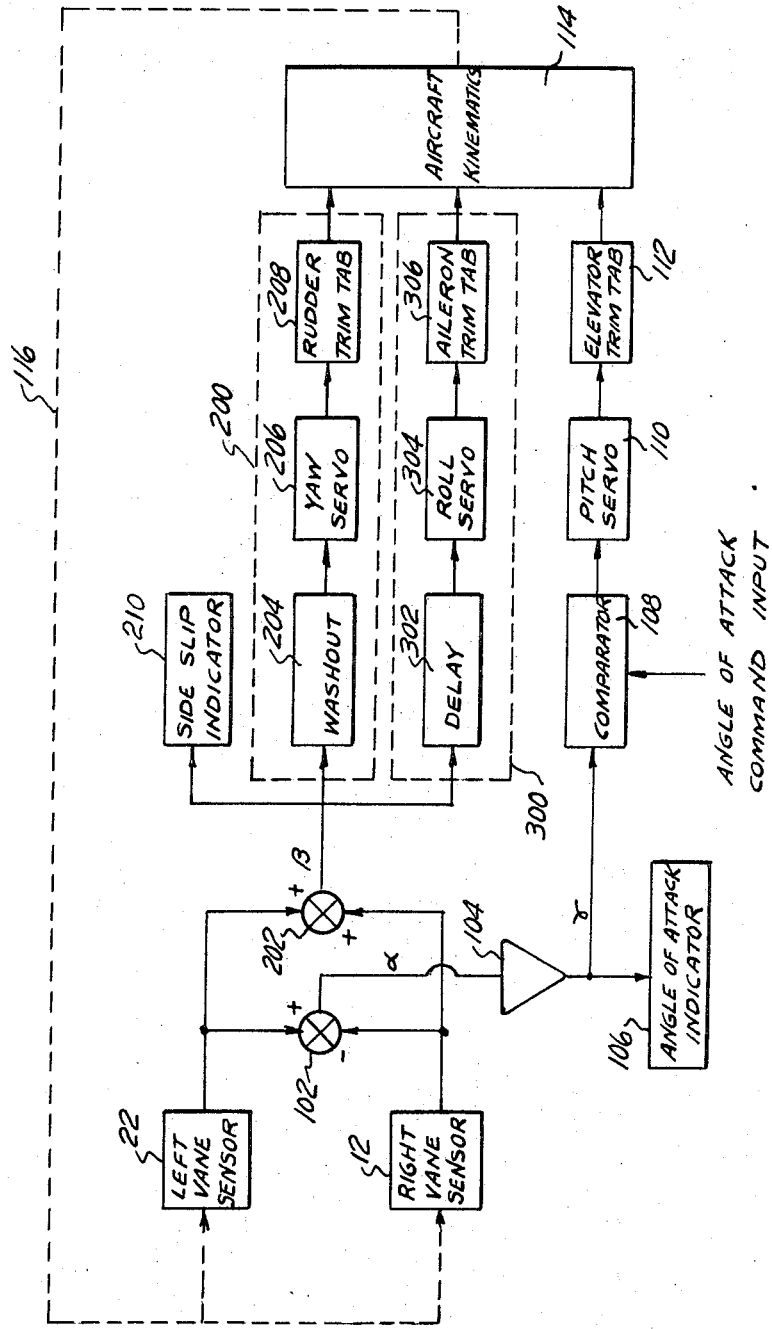

SYSTEM FOR AUGMENTING AIRCRAFT ATTITUDE STABILITY USING VERTICAL VANE TYPE SENSORS

BACKGROUND OF THE INVENTION

This invention relates to the field of sensor activated systems for automatically augmenting the inherent attitude stability of aircraft, and particularly to a system using vertically mounted weathercock vane type sensors near each wing tip.

As is generally known, an aircraft is designed to fly in the atmosphere above the earth and is capable of assuming almost any conceivable attitude with reference to its direction of motion and to the earth below. The attitude of an aircraft is usually described with reference to three orthogonal axes related to the physical geometry of the aircraft as shown in FIG. 1. The three orthogonal axes are the roll axis which is an imaginary line through the center of gravity of the aircraft and generally parallel to the longitudinal axis of the aircraft fuselage; the pitch axis is an imaginary line through the center of gravity of the aircraft, perpendicular to the roll axis and generally parallel to the plane of the wings; and the yaw axis is an imaginary line through the center of gravity of the aircraft, and orthogonal to the roll and pitch axes. The terms roll, pitch and yaw refer to the rotational attitude of the aircraft about these three axes respectively.

A well designed aircraft is configured so that under given flight conditions the aircraft assumes a predeterminable stable attitude in which the forces acting on the aircraft are in equilibrium, i.e., the lift generated by the wings is equal and opposite to the gravitational pull of the earth, all lateral forces are equal and opposite and the thrust generated by the engine is equal and opposite to drag caused by the motion of the aircraft through the air. The aerodynamic surfaces are configured to inherently maintain the aircraft in this stable attitude. The roll stability is achieved by setting the wings at a small angle to the lateral plane of the aircraft such that the wing tips are higher than the central section of the wing. When the aircraft rolls, this angular displacement of the wings, called dihedral, causes the wing which is depressed to generate additional life and the wing which is elevated to generate a reduced lift. This lift differential acting on the opposite wings generates a force, or moment, about the roll axis of the aircraft which rotates the aircraft in the opposite direction of the roll until the angle each wing makes with respect to the ground is equal, and therefore, the lift generated by each wing is equal.

Yaw stability is achieved by both the wing dihedral and the vertical stabilizer. When the yaw heading of the aircraft is not aligned with the flight path, the dihedral also causes the leading wing to generate additional lift, and the trailing wing to generate reduced lift. The lift differential acting on the opposite wings, generates a moment about the roll axis of the aircraft which rotates the aircraft in a direction to reduce the yaw angle or until the wing angle each wing makes with respect to the ground is equal.

The vertical stabilizer normally located well behind the center of gravity of the aircraft and aligned with the longitudinal axis functions much like a weather vane and aligns the aircraft with the direction of motion of the aircraft providing additional yaw stability. A comparable horizontal stabilizer, also located well behind the center of gravity of the aircraft and generally parallel to the longitudinal axis, maintains the pitch attitude of the aircraft. The horizontal stabilizer has the added function of maintaining the wing at a predetermined angle of attack so that the lift generated by the wing is of a predetermined value. The lift generated by the wings may be equal to or more or less than the force of gravity depending upon the desired vertical acceleration or change in flight attitude of the aircraft.

The wing dihedral, the vertical stabilizer and the horizontal stabilizer combine to impart to the aircraft an inherent stability which will tend to make the aircraft return to a level attitude if it is disturbed for any reason. Unfortunately, however, the aircraft response to these built-in stabilizing features is usually relatively slow, and significant changes in the desired flight path can occur before the aircraft returns to the level attitude. This factor becomes increasingly important during the critical phases of any flight, i.e., during the take-off and/or landing or when the aircraft encounters asymmetrical winds or gusts which affect the lift generating surfaces or stabilizing surfaces of the aircraft differently. Various attitude control systems have been developed to augment the inherent attitude stability of aircraft, and return the aircraft to its stable attitude much more quickly than the aircraft inherent kinematics. These control systems can produce not only a smoother flight but also increase flight safety.

Ordinarily, aircraft attitude control systems use gyroscopes as a reference from which a departure from a given flight attitude is measured. However, complicated gyroscope based flight controls are relatively expensive and beyond the financial means of most light aircraft owners. Further, gyroscopes are delicate devices and are subject to malfunction due to contamination and wear, further increasing the maintenance costs of gyro systems for stability augmentation. A present need exists for a relatively inexpensive system which is within the finanical means of the majority of light aircraft owners.

Various types of vertically mounted vane type sensors have been used for augmenting the sideslip and yaw attitude of an aircraft resulting from asymmetrical winds or gusts and horizontal vane sensors have been used for augmenting the longitudinal attitude of the aircraft. U.S. Pat. No. 2.707,602 discloses a system using a pair of rotatably mounted vertical vanes for sensing the sideslip of an aircraft and includes a servo mechanism for actuating flight control surfaces on the wing to improve the lateral stability of the aircraft. Pat. No. 2,962,243 discloses a gust sensing system which uses a plurality of gust sensors located forward of the gust affected areas of the aircraft. Pat. No. 2,595,363 discloses a pair of wing tip vane sensors for correcting the yaw attitude of tailless aircraft and Pat. No. 3,172,079 discloses a horizontally mounted vane to sense the aircraft angle of attack which is employed to generate a stall warning signal. Although the above-described systems are independelty capable of augmenting the inherent attitude stability of an aircraft about one or possibly two axes of the aircraft, none of these systems alone is capable of augmenting the inherent stability of the aircraft about all three axes of rotation.

SUMMARY OF THE INVENTION

The present invention is directed to a system for augmenting the inherent attitude stability of an aircraft about all three axes of rotation using two (weathercock) vane type sensors, one mounted vertically a short distance inboard from each wing tip. The vane sensors respond to direction of air flow near the wing tips and generate signals indicative of the flight attitude of the aircraft. In all flight attitudes, vortices generated at each wing tip perturbate the air flow pattern about the entire wing, but most strongly in the immediate vicinity of the wing tips. The vane sensors at the wing tips align with the perturbed air flow pattern and generate signals which are indicative of the angular direction of the air flow at each wing tip. The angular direction of the air flow near each wing tip is proportional to the magnitude of the vortex generated which in turn is a function of the angle of attack of the wing. An angle of attack servo system which controls the aircraft attitude about the pitch axis responds to the angular difference between the vane sensor on the left wing and the vane sensor on the right wing and actuates a flight control surface on the horizontal stabilizer when the difference signal departs from a predetermined signal indicative of the desired wing angle of attack. A reference signal indicative of the desired angle of attack of the wing may be manually set into the angle of attack servo system by the aircraft operator, however, various alternate automatic means may be used.

A sideslip or yaw attitude of the aircraft causes the nominal direction of air flow in the vicinity of the vane sensors to change with regard to the longitudinal axis of the aircraft. Both vane sensors will rotate in the same direction and become aligned with the nominal direction of the air flow, and generate a signal indicative of the sideslip or yaw attitude of the aircraft. Roll and yaw servo systems respond to the sum of the signals generated by the vane sensors and actuate flight control surfaces on at least one wing and/or the rudder when the signals received from the vane sensors are indicative of a departure from the desired lateral flight attitude of the aircraft. Actuation of the flight control surfaces augment the return of the aircraft to the desired lateral attitude. Lateral attitude as used in this description, refers to either the yaw or roll attitude of the aircraft or both in combination. Due to the cross coupling of these attitudes, the vane sensor response to one or the other condition is nearly identical.

A gust or sudden change in wind direction will also cause both vane sensors to rotate and become aligned with the air flow in the immediate vicinity of the sensors. Because the vane sensors have a relatively low mass, and therefore, a relatively low moment of inertia compared to the moment of inertia of the aircraft, the sensors response to the gust is much quicker than the aircraft response. The sensors generate a signal indicative of the magnitude and direction of the gust, or change of wind direction, and the augmentation system actuates the flight control surfaces to compensate for the gust before the attitude of the aircraft has changed significantly. The ability of the sensors to respond quickly to gusts or changes in wind direction provides excellent gust alleviation.

BRIEF DESCRIPTION OF THE DRAWINGS

FIG. 9 is a block diagram of a preferred embodiment of the inventive attitude augmentation system.

DETAILED DESCRIPTION OF THE INVENTION

Figure 2:
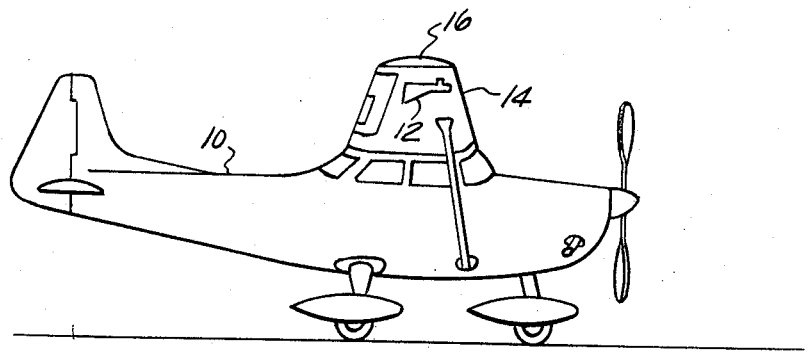
FIG. 2 is a profile of a conventional high wing light aircraft, showing a preferred location of the vane sensors on the aircraft.

Referring to FIG. 2, a conventional high-wing light aircraft 10 is shown with the vertical weathercock type sensor 12 mounted below the wing 14 a short distance inboard from the wing tip 16. A second sensor 22 (FIG. 3) is also mounted on the left wing in the same relative position with respect to the left wing tip. The sensors 12 and 22 are placed sufficiently close to the wing tips so that the sensors are under the influence of the vortices generated at the wing tips during flight. Sensors 12 and 22 assume a predetermined angular position with respect to the longitudinal axis of aircraft when the aircraft is on a straight and level flight. The normal angular displacement between the sensors 12 and 22 is shown as $\alpha/2$ in FIG. 3. Since vortices generated at the wing tips cause the direction of air flow under the wing to be deflected towards the wing tips, the vane sensors on the opposite wing tips move outwardly in the opposite directions. The total angle between the two sensors is thus designated as the angle $\alpha$. If the vanes were mounted on top of the wings as they may be within the scope of this invention, the direction of air flow would be deflected away from the wing tips and the sensor vanes would move inwardly towards each other.

The vortex causing the vane sensors to assume an angle to the longitudinal axis of the aircraft is generated by air circulation around the wing tip from the high pressure region under the wing to the low pressure region above the wing. The circulation strength of the vortex is given by the equation:

$$T = (1/2)c\ VC_L = 2\pi\ V_r r \qquad (1)$$

where:
$c$ = mean cord of wing
$C_L$ = coefficient of lift of the wing
$r$ = vortex radius
$V$ = air speed
$V_r$ = vortex speed
$T$ = circulation strength The wing coefficient of lift is approximately a linear function of the wing angle of attack $\gamma$ below stall speed, therefore $$C_L = K_1 \gamma \quad (2)$$

where zero angle of attack is considered to be the angle at which the lift is zero. Then, $$(1/2)c\ VK_1\gamma = 2\pi V_r r \quad (3)$$

and, $$V_r/V = cK_1/4\pi r\ \gamma = K_2\gamma \quad (4)$$

The vane angle ($\alpha/2$) due to the wing tip vortex flow is given by $$\tan(\alpha/2) = V_r/V \quad (5)$$

Expanding $\tan(\alpha/2)$ in the Taylor series gives $$\tan(\alpha/2) = \alpha/2 + 1/3\ (\alpha/2)^{1/2} + \text{- - -} \quad (6)$$

For angles of interest, only the first term of the Taylor series is significant, therefore $$\alpha = K_3\gamma \quad (7)$$

From equation (7), the included angle, $\alpha$, between the vanes is proportional to the angle of attack $\gamma$ independent of wing geometry, air speed, attitude or temperature. Therefore, the wing tip vane sensors function as a true angle of attack sensor, even though they are physically oriented in a vertical plane.

Figure 3:
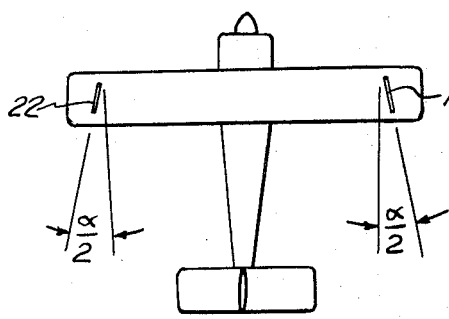
FIG. 3 is a plan view of an aircraft showing the relative attitude of the vane sensors in a normal horizontal flight.
Figure 4:
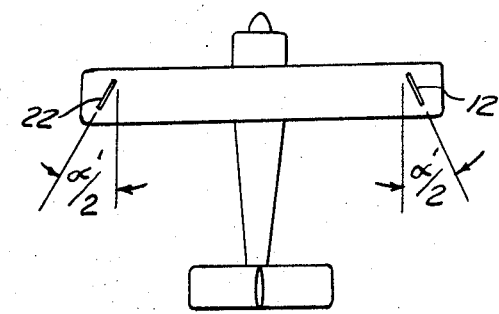
FIG. 4 is a plan view of the same aircraft showing the change in attitude of the vane sensors when the wings' angle of attack is increased.

As the angle of attack increases, the included vane angle, $\alpha$, increases as shown in FIG. 4 were the sensor angle $\alpha'/2$ is larger than the sensor angle $\alpha/2$ in FIG. 3 which represents the level flight condition.

Figure 5:
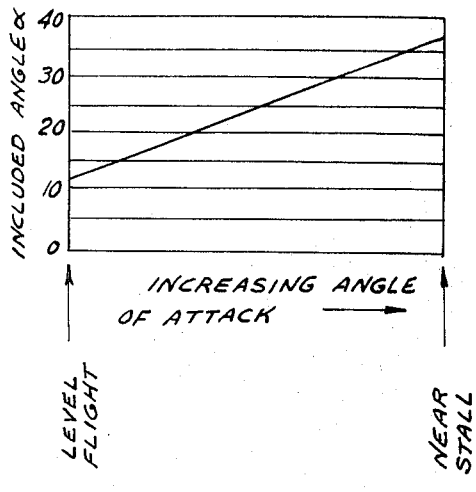
FIG. 5 is a graph showing the relative change in the angular difference "$\alpha$" between the vane sensors as a relative function of the wing's angle of attack.
Figure 1:
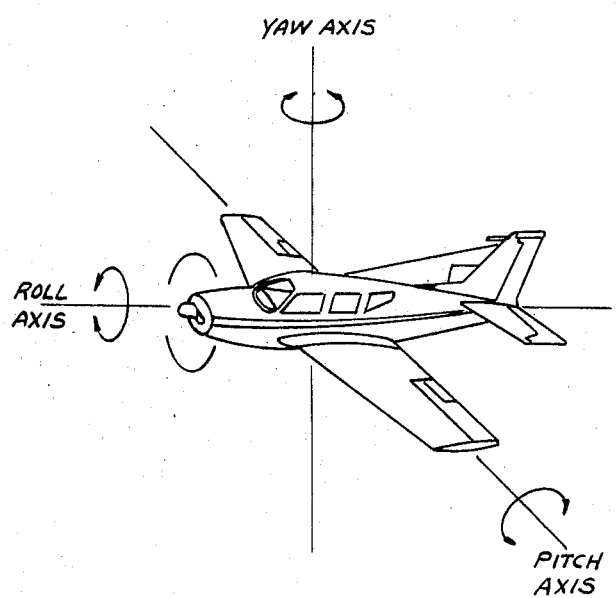
FIG. 1 is a perspective view of an aircraft showing the orientation of the three axes of rotation with respect to the physical geometry of the aircraft.

The graph of FIG. 5 shows the relative increase in the included angle, $\alpha$, between the sensor on the right wing and the sensor on the left wing as a function of the angle of attack going from a level flight attitude to near stall condition during a test flight. During level flight, the included angle was approximately 12° but increased to approximately 37° as the aircraft approached a stall attitude.

Figure 6:
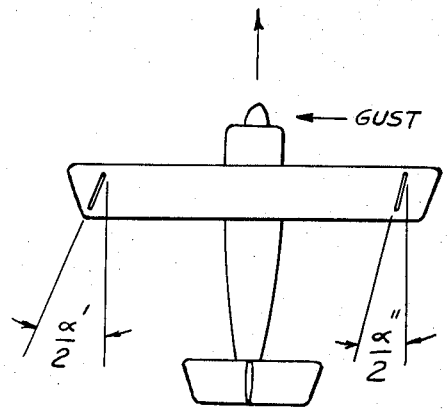
FIG. 6 is a plan view of an aircraft showing the relative attitude of the vane sensors in a sideslip condition or the result of a cross wind or gust.
Figure 7:
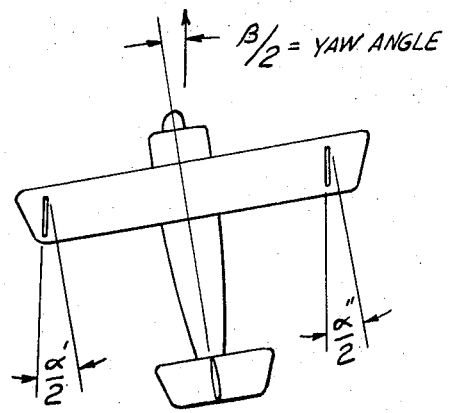
FIG. 7 is a plan view of the aircraft showing the relative attitude of the vane sensors in a yaw condition.

FIG. 6 shows typical vane sensor positions as the result of sideslip attitude or a cross wind gust and FIG. 7 illustrates the position of the vanes when the aircraft is in a yaw attitude. The sum of the vane angles $\alpha''/2 + \alpha'''/2$ due to sideslip, gust, or yaw equals twice the angle of sideslip or yaw which is designated as the angle $\beta$, even though the angles $\alpha''/2 + \alpha'''/2$ assumed by the individual sensors with respect to the longitudinal axis of the aircraft are different. The difference between the two angles is the angle $\alpha$ which is due to the wing tip vortices discussed above.

Figure 8:
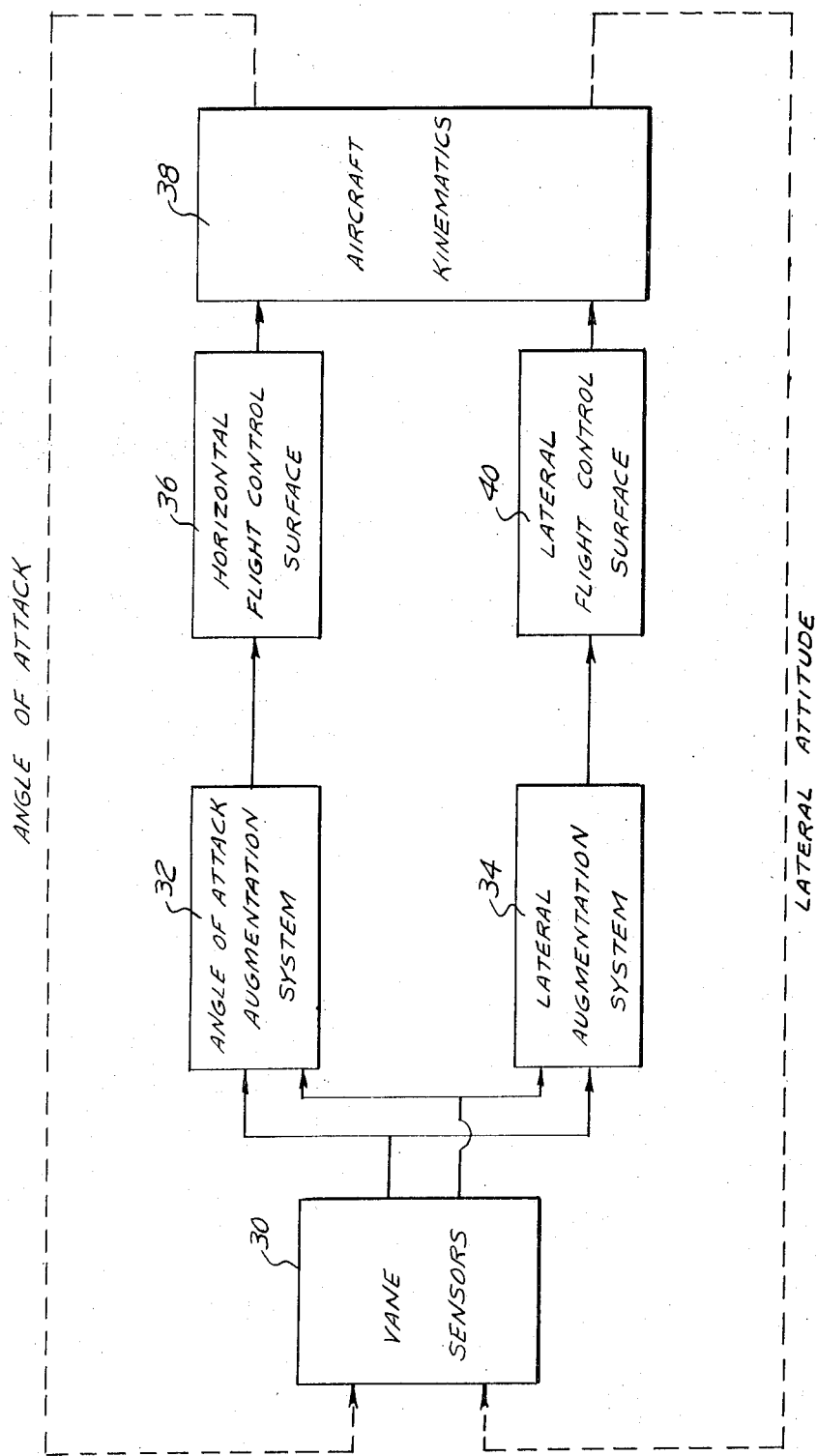
FIG. 8 is a simplified block diagram of the inventive attitude augmentation system.

FIG. 8 is a simplified blck diagram of the inventive attitude stability augmentation system. The vane sensors 12 and 22 are generally designated by the block 30. Each vane sensor generates a signal indicative of the angle of the associated vane. These two vane sensor signals are communicated to the angle of attack augmentation system 32 and the lateral augmentation system 34. The angle of attack augmentation system 32 computes the angular difference between the two vane sensor signals and compares the difference signal with a reference signal. The angle of attack augmentation system includes a servo responsive to the error signal resulting from the comparison and actuates a horizontal flight control surface 36. The horizontal flight control surface may be the elevator on the horizontal stabilizer, a trim tab on the elevator or even an independent canard flight control surface. Actuation of the horizontal flight control surface, changes the kinematics 38 of the aircraft and augments the return of the aircraft to the desired wing angle of attack.

The lateral augmentation system 34 computes the sum of the signals generated by the vane sensors 30 and actuates at least one lateral flight control surface 40. The lateral flight control surface may be either the rudder or ailerons of a conventional aircraft or both, trim tabs on either the rudder or the ailerons or both, or their equivalent, such as spoilers as used on some aircraft. Actuation of any lateral flight control surface changes the kinematics of the aircraft and augments the return of the aircraft to its lateral stable attitude.

It should also be appreciated that while the preferred embodiment is described with respect to a conventional aircraft having both horizontal and vertical stabilizer capability, the inventive attitude augmentation system is equally adaptable to aircraft having other types of stabilizer configurations including the well known "butterfly" or "Vee" stabilizers.

FIG. 9 is a block diagram of a preferred embodiment of the inventive attitude stability augmentation system. The vane sensors 12 and 22 provide output signals indicative of their angular position with respect to the longitudinal axis of the aircraft. The signal generated by the left vane sensor 22 and the signal generated by the right vane sensor 12 are communicated to a difference amplifier 102 which subtracts the signal generated by the left sensor 22 from the signal generated by the right sensor 12 and generates a difference signal indicative of the included angle $\alpha$ between the two sensors. The difference signal is communicated to amplifier 104 which generates a signal indicative of the angle of attack of the wing where $\alpha = K_3\gamma$, and $K_3$ is a constant. The signal $\gamma$ is communicated to an angle of attack indicator 106 which gives the pilot a visual indication of the angle of attack. The signal $\gamma$ is also communicated to a comparator amplifier 108 which compares the measured angle of attack $\gamma$ with the command angle of attack signal manually placed in a comparator amplifier 108 by the aircraft operator or pilot. The command angle of attack signal may be a D.C. voltage generated at the center tap of a potentiometer, or any other suitable means, which may be selected by the aircraft's operator by means of an external control. The comparator amplifier 108 generates a difference signal indicative of the direction and magnitude between the measured angle of attack and the command angle of attack. The direction of the difference between the commanded and the measured wing angle of attack may be determined by the polarity of the signal while the magnitude of the difference between the actual and commanded angle of attack may be determined by the magnitude of the difference signal. The pitch servo 110 responds to the magnitude and polarity of the difference signal and actuates a flight control surface on the horizontal stabilizer, which in this embodiment is an elevator trim tab 112 changing the kinematics 114 of the aircraft. The aircraft responds to the change in kinematics and returns the aircraft to the commanded wing angle of attack as indicated by the dashed line 116 closing the servo loop back to the vane sensors 12 and 22.

The sum amplifier 202 adds the signals generated by the left and right vane sensors 22 and 12 respectively and generates a sum signal $\beta$ indicative of twice the aircraft's sideslip or yaw angle. The sum signal $\beta$ is communicated to the yaw servo system indicated by the blocks enclosed by the dashed line 200 and to the roll servo system indicated by the blocks enclosed by dashed line 300. Referring to the yaw servo system 200, the sum signal $\beta$ is passed through a washout circuit 204 permitting the pilot to execute turns without having the yaw servo system counteracting his commands. The washout circuit 204 produces an output only during the transient period of the $\beta$ signal. The output signal of the washout circuit 204 is zero in a steady state attitude of the aircraft. The transfer function of the washout circuit is:

$$K \tau S/\tau S + 1$$

where:

$K$ is a constant $\tau$ is a time period where $1/\tau$ equals spiral divergence $S$ is the Laplace Transfer Function The dynamics of yaw correction and use of the washout circuit are well known, and are discussed in detail in "Automatic Control of Aircraft and Missiles" by J. H. Blakelock, John Wiley and Sons, 1965, pp. 138–140.

The momentary signal from the washout circuit 204 is communicated to the yaw servo system 206 which actuates a rudder trim tab 208. Actuation of the rudder trim tab 208 changes the kinematics of the aircraft 114 and augments the return of the aircraft to a stable yaw attitude.

Figure 10:
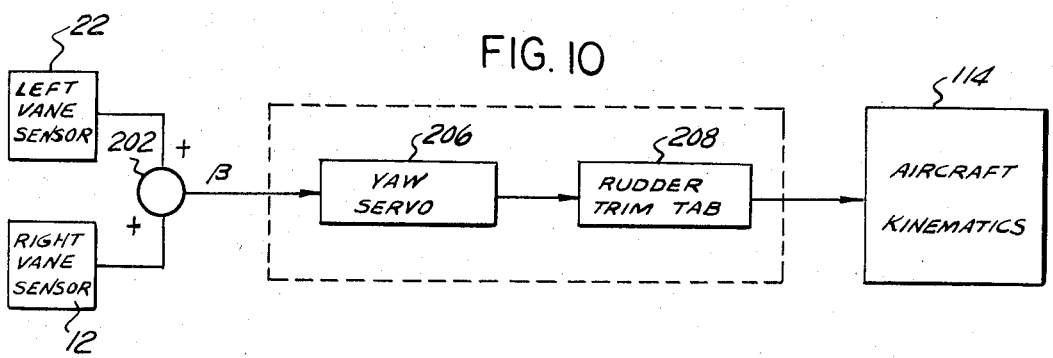
FIG. 10 is a block diagram of an alternate embodiment of the yaw augmentation system.

Flight tests with the inventive system augmenting the attitude stability of a light aircraft have shown that the washout circuit 204 may be eliminated as shown in FIG. 10 on certain types of aircraft without producing significant interference with the pilot's execution of coordinated turns.

Figure 11:
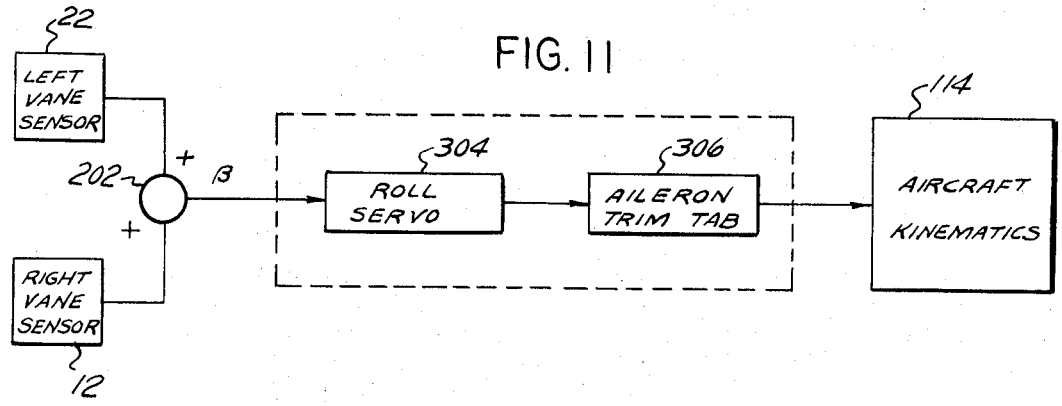
FIG. 11 is a block diagram of an alternate embodiment of the roll augmentation system.

The sum signal $\beta$ is also communicated to the roll servo system 300 to augment the inherent stability of the aircraft as a result of cross winds or gusts which would cause the aircraft to bank or roll and assume a sideslip attitude. The sum signal $\beta$ is momentarily delayed by the delay circuit 302 before being communicated to the roll servo 304 which actuates a flight control surface on the wings. In the preferred embodiment the flight control surface is an aileron trim tab 306. The tab 306 is driven in a direction to eliminate the roll attitude of the aircraft and restore the aircraft to a normal level flight attitude. Flight tests have also shown that the delay circuit 302 may be omitted in attitude augmentation systems used on particular types of aircraft, and the $\beta$ signal may be communicated directly to the roll servo 304 as shown in FIG. 11. One skilled in the art will recognize that either the yaw or roll trim servo subsystems may be omitted from the inventive attitude augmentation system and still provide an improved degree of attitude stability.

The $\beta$ signal may also be communicated to a sideslip indicator 210 giving the aircraft operator a visual indication of the sideslip attitude of the aircraft.

Electronic circuits and vane sensors to perform the functions described with reference to the various blocks in the inventive system are well known in the art, and therefore, require no detailed explanation herein.

The servo systems are illustrated as actuating auxiliary trim tabs on the flight control surfaces of the aircraft. The use of surface mounted trim tabs greatly lowers the equipment and installation costs since actuation means for the main flight control surfaces do not have to be altered. Further, the force provided by the surface mounted trim tabs is low enough to be pilot overridden in the case of a malfunction. However, one skilled in the art will recognize that the servo systems may actuate directly the primary or other flight control surfaces of the aircraft.

What is claimed is:

1. A system for augmenting the inherent attitude stability of an aircraft having wings and stabilizer means and flight control surfaces mounted on the wings and stabilizer means comprising:
    sensor means for individually generating signals indicative of the lateral direction of the air flow in the immediate vicinity of the opposite wing tips of the aircraft;
    means for subtracting and adding said individually generated signals to produce a difference signal and a sum signal;
    angle of attack augmentation means responsive to said difference signal for actuating at least one flight control surface to augment the inherent attitude stability of the aircraft to maintain a predetermined wing angle of attack; and
    lateral augmentation means responsive to said sum signal for actuating at least one flight control surface to augment the inherent attitude stability of the aircraft to maintain a predetermined lateral attitude.

2. The system of claim 1 wherein said sensor means are two vane sensors, rotatably mounted inwardly from each of said opposite wing tips about an axis generally normal to the plane of the wing, said vane sensors having aerodynamic surfaces which align with the direction of air flow at said wing tips.

3. The system of claim 1 wherein said angle of attack augmentation means comprises:
    comparator means including reference signal generating means, for comparing said difference signal with said reference signal and for generating an error signal indicative of the difference between said difference signal and said reference signal; and angle of attack servo means responsive to said error signal for actuating at least one flight control surface to augment the inherent attitude stability of the aircraft to maintain a predetermined wing angle of attack.

4. The system of claim 3 wherein said reference signal generating means is a signal generator having an output signal, said output signal controlled by the operator of the aircraft, and being indicative of a commanded wing angle of attack.

5. The system of claim 3 wherein said angle of attack augmentation means includes an amplifier means responsive to said difference signal for generating an angle of attack signal.

6. The system of claim 5 wherein said angle of attack augmentation means further includes an angle of attack indicator responsive to the angle of attack signal giving a visual indication of the wing's angle of attack.

7. The system of claim 6 wherein the stabilizer means includes a vertical stabilizer, said lateral augmentation means is yaw servo means and the flight control surface actuated by said yaw servo means is a flight control surface on the vertical stabilizer.

8. The system of claim 7 wherein said sum signal has a transient state when the direction of air flow is changing about the wing tips, said lateral servo means further includes a washout means responsive to said transient state for communicating said sum signal to said yaw servo means only during the occurrence of said transient state and a predeterminable period of time thereafter.

9. The system of claim 6 wherein said lateral servo means is a roll servo means, and the flight control surface actuated by said roll servo means is at least one flight control surface on the aircraft's wings.

10. The system of claim 9 wherein said sum signal has a stable state when the direction of air flow about the wing tips is stable, said roll servo means further includes a delay means responsive to said stable state for communicating said sum signal to said roll servo means only during said stable state.

11. The system of claim 1 wherein said lateral augmentation means comprises:
yaw servo means for actuating a flight control surface on the stabilizer means; and
roll servo means for actuating at least one flight control surface on the wings.

12. The system of claim 11 wherein said sum signal has a transient state when the direction of air flow about the wing tips is changing, said lateral augmentation means further includes a washout means responsive to said transient state for communicating said sum signal to said yaw servo means only during the occurrence of said transient state and a predeterminable period thereafter.

13. The system of claim 11 wherein said sum signal has a stable state when the direction of air flow about the wing tips is stable, said lateral augmentation means further includes a delay means responsive to said stable state for communicating said sum signal to said roll servo means only during said stable state.

14. The system of claim 13 wherein said sum signal has a transient state between said stable states wherein said lateral augmentation means further includes a washout means responsive to said transient state for communicating said sum signal to said yaw servo means only during the occurrence of said transient state and a predeterminable period thereafter.

15. A system for augmenting the inherent attitude stability of the aircraft having wings and stabilizer means configured to provide the aircraft with an inherent attitude stability about the pitch, roll and yaw axes of the aircraft comprising:
at least one pitch flight control surface for controlling the attitude of the aircraft about the pitch axis;
two air flow direction sensors, one mounted inwardly from each of the opposite wing tips, for generating attitude signals indicative of the lateral direction of the air flow near each wing tip; and
angle of attack augmentation means responsive to said attitude signals for actuating said at least one pitch flight control surface augmenting the inherent attitude stability of the aircraft to maintain a predeterminable wing angle of attack.

16. The system of claim 15 wherein said air flow sensors are vane sensors having aerodynamic surfaces rotatably mounted about an axis generally normal to the plane of the wing, said aerodynamic surfaces rotate to align with the direction of air flow near each wing tip.

17. The system of claim 15 wherein said angle of attack servo means comprises:
a difference amplifier for subtracting said attitude signals, one from the other to generate a difference signal indicative of the magnitude of the difference between the lateral direction of the air flow at the wing tips;
comparator means including reference signal generating means, comparing said difference signal with said reference signal, generating an error signal indicative of the magnitude and direction of the difference between said difference signal, and said reference signal; and
pitch servo means responsive to said error signal for actuating said at least one pitch flight control surface.

18. The system of claim 17 further comprising:
at least one roll flight control surface for controlling the attitude of the aircraft about the aircraft's roll axis; and
roll augmentation means responsive to said attitude signal for actuating said at least one roll flight control surface, augmenting the return of the aircraft to inherent stable attitude of the aircraft when the attitude signals indicate the aircraft has departed from the inherent stable attitude.

19. The system of claim 18 wherein said roll augmentation means comprises:
a sum amplifier for adding said attitude signals, one to the other to generate a sum signal indicative of the sum of the lateral direction of the air flow at each wing tip; and
roll servo means responsive to said sum signal for actuating said at least one roll flight control surface.

20. The system of claim 19 wherein said sum signal has a stable state when said air flow sensor is stable, said roll servo means further includes a delay means responsive to said stable state of said sum signal for communicating said sum signal to said roll servo means only during said stable state.

21. The system of claim 15 further comprising:
at least one yaw flight control surface for controlling the attitude of the aircraft about the yaw axis of the aircraft; and
yaw augmentation means responsive to said attitude signal for actuating said yaw flight control surface augmenting the inherent yaw attitude stability of the aircraft.

22. The system of claim 21 wherein said yaw augmentation means comprises:
a sum amplifier for adding said attitude signals, one to the other to generate a sum signal indicative of the sum of the lateral direction of the air flow at each wing tip; and yaw servo means responsive to said sum signal for actuating said at least one yaw flight control surface.

23. The system of claim 22 wherein said sum signal has a transient state when said air flow sensors are rotating, said yaw servo means further includes a washout means responsive to said transient state of said sum signal for communicating said sum signal to said yaw servo means only during the occurrence of said transient state and a predeterminable period thereafter.

24. The system of claim 21 further including:

at least one roll flight control surface for controlling the aircraft about the roll axis; and roll augmentation means responsive to said attitude signal for actuating said at least one roll control surface, augmenting the return of the aircraft to its inherent stable attitude when the attitude signals indicate the aircraft has departed from its inherent stable attitude.

* * * * *